United States Patent
Ponnuswamy

(10) Patent No.: US 10,547,420 B2
(45) Date of Patent: Jan. 28, 2020

(54) COOPERATIVE SCANNING OF WIRELESS DEVICES

(71) Applicant: KodaCloud Inc., Campbell, CA (US)

(72) Inventor: Subbu Ponnuswamy, Saratoga, CA (US)

(73) Assignee: KodaCloud Inc., Campbell, CA (US)

( * ) Notice: Subject to any disclaimer, the term of this patent is extended or adjusted under 35 U.S.C. 154(b) by 237 days.

(21) Appl. No.: 14/755,583

(22) Filed: Jun. 30, 2015

(65) Prior Publication Data

US 2017/0006452 A1 Jan. 5, 2017

(51) Int. Cl.
*H04W 72/04* (2009.01)
*H04L 5/00* (2006.01)
*H04W 88/02* (2009.01)

(52) U.S. Cl.
CPC ........... *H04L 5/0035* (2013.01); *H04W 88/02* (2013.01)

(58) Field of Classification Search
None
See application file for complete search history.

(56) References Cited

U.S. PATENT DOCUMENTS

| | | | |
|---|---|---|---|
| 7,084,809 B2 | 8/2006 | Hockley et al. | |
| 7,239,277 B2 | 7/2007 | Fullerton et al. | |
| 7,983,222 B2 | 7/2011 | Giaimo et al. | |
| 8,971,350 B1 | 3/2015 | Liu | |
| 9,042,324 B2 | 5/2015 | Zhang et al. | |
| 10,021,529 B2 | 7/2018 | Narasimhan et al. | |
| 2002/0075825 A1 | 6/2002 | Hills et al. | |
| 2003/0148765 A1 | 8/2003 | Ma et al. | |
| 2004/0198392 A1 | 10/2004 | Harvey et al. | |
| 2005/0210501 A1* | 9/2005 | Zigmond | G11B 27/105 725/32 |
| 2005/0246334 A1 | 11/2005 | Tao et al. | |
| 2006/0068731 A1 | 3/2006 | Seier | |
| 2006/0098588 A1* | 5/2006 | Zhang | H04L 67/104 370/255 |
| 2007/0207816 A1 | 9/2007 | Spain, Jr. | |
| 2010/0284345 A1 | 11/2010 | Rudrapatna et al. | |
| 2011/0183626 A1 | 7/2011 | Das et al. | |
| 2011/0183683 A1 | 7/2011 | Das et al. | |
| 2011/0237259 A1 | 9/2011 | Dimou et al. | |
| 2012/0040696 A1 | 2/2012 | Siomina et al. | |
| 2012/0236716 A1* | 9/2012 | Anbazhagan | H04L 41/5022 370/235 |
| 2012/0238267 A1* | 9/2012 | Kim | H04L 27/0006 455/434 |
| 2012/0311173 A1 | 12/2012 | Agarwal et al. | |
| 2014/0357294 A1 | 12/2014 | Rajakarunanayake et al. | |
| 2015/0094085 A1 | 4/2015 | Agrawal et al. | |
| 2015/0257013 A1* | 9/2015 | Patel | H04W 16/20 370/252 |
| 2015/0304880 A1* | 10/2015 | Kotecha | H04W 28/0215 455/437 |

(Continued)

Primary Examiner — Brandon M Renner
(74) Attorney, Agent, or Firm — Invoke

(57) ABSTRACT

Wireless environment information is obtained by aggregating data corresponding to wireless signals detected by wireless devices in the wireless environment. A wireless device is configured to obtain additional information for a wireless environment based on determining that wireless environment information is insufficient. One or more devices are configured based at least on the additional information.

19 Claims, 4 Drawing Sheets

(56) References Cited

U.S. PATENT DOCUMENTS

| | | | |
|---|---|---|---|
| 2015/0305049 A1* | 10/2015 | Farkas | H04L 5/0035 |
| | | | 370/329 |
| 2015/0312724 A1 | 10/2015 | Singh et al. | |
| 2016/0029249 A1* | 1/2016 | Chou | H04L 5/0085 |
| | | | 370/338 |
| 2016/0037424 A1 | 2/2016 | Xie et al. | |
| 2016/0119838 A1 | 4/2016 | Kapoor et al. | |
| 2016/0127943 A1* | 5/2016 | Shaw | H04W 28/0231 |
| | | | 370/230 |

* cited by examiner

COOPERATIVE SCANNING OF WIRELESS DEVICES

INCORPORATION BY REFERENCE; RELATED APPLICATIONS

This application is related to U.S. Non-Provisional patent application Ser. No. 14/788,310, filed Jun. 30, 2015, and U.S. Non-Provisional patent application Ser. No. 14/788, 397, filed Jun. 30, 2015, all of which are hereby incorporated by reference.

TECHNICAL FIELD

The present disclosure relates to obtaining information about a wireless environment. In particular, the present disclosure relates to cooperative scanning of wireless devices to obtain information about a wireless environment.

BACKGROUND

In recent years, Wireless Local Area Network (WLAN) technologies have emerged as a fast-growing market. Among the various WLAN technologies, Institute of Electrical and Electronics Engineers (IEEE) 802.11 standard is the dominating technology and is frequently used for WLANs. The IEEE 802.11 standard includes operations in one or more bands (such as the 2.400-2.500 GHz band and/or the 4.915-5.825 GHz band), and multiple channels within each band.

Client devices within WLANs communicate with access points to obtain access to one or more network resources. Access points are digital devices that may be communicatively coupled to one or more networks (e.g., Internet, an intranet, etc.). Access points may be directly connected to the one or more networks or connected via a controller. An access point, as referred to herein, may include a wireless access point (WAP) that communicates wirelessly with devices using Wi-Fi, Bluetooth or related standards and that communicates with a wired network. An access point performs periodic scanning on one or more channels in order to obtain information about a wireless environment.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
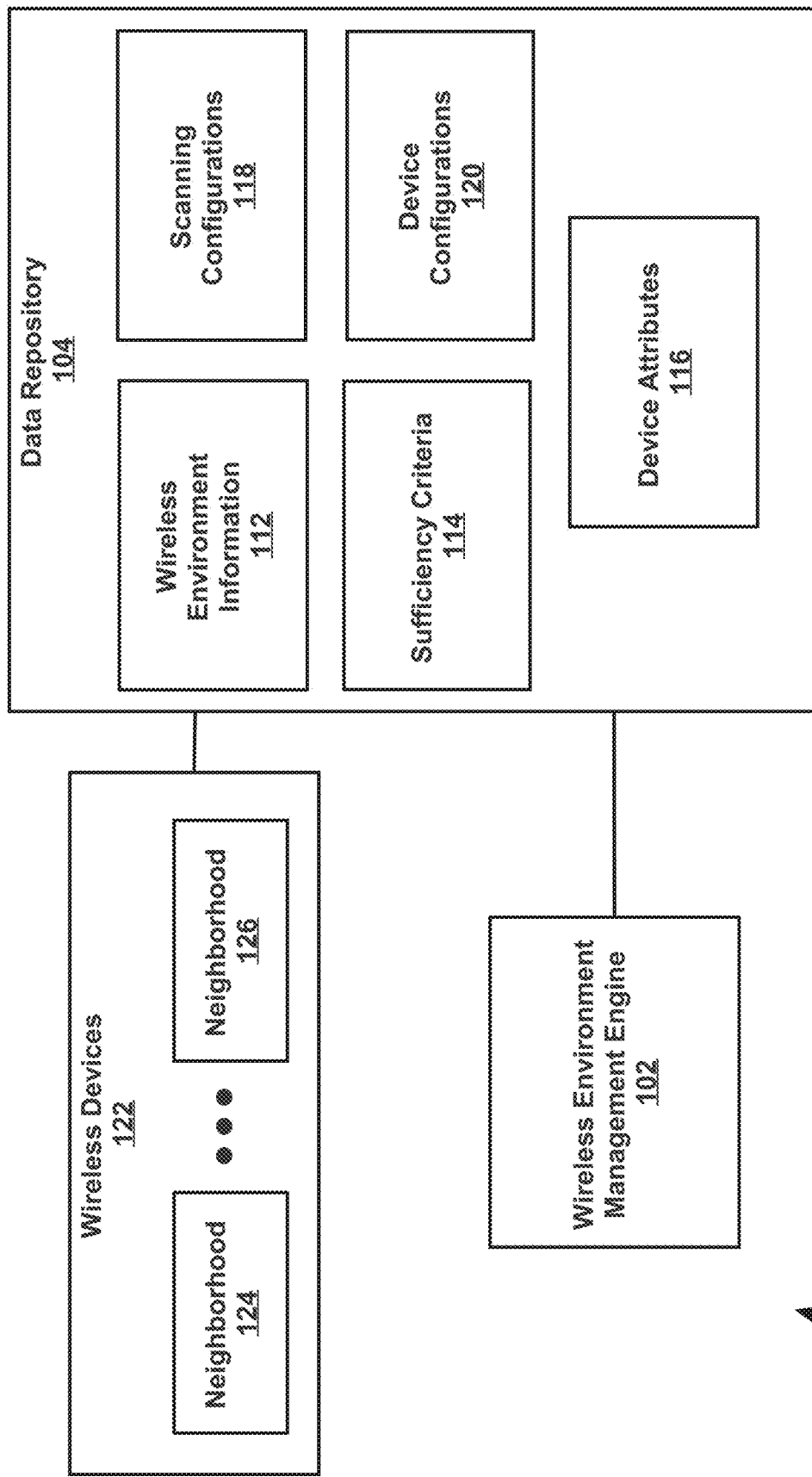
FIG. 1 shows a block diagram example of a system in accordance with one or more embodiments.

In the following description, for the purposes of explanation, numerous specific details are set forth in order to provide a thorough understanding. One or more embodiments may be practiced without these specific details. Features/components described in one embodiment may be combined with features/components described in a different embodiment. In some examples, well-known structures and devices are described with reference to a block diagram form in order to avoid unnecessarily obscuring the present invention.

A. GENERAL OVERVIEW

In one or more embodiments, wireless environment information is obtained by aggregating data detected by wireless devices in the wireless environment. Wireless environment information includes, but is not limited to, number, types or identities of other wireless devices, a signal strength of a wireless signal, noise floor, and/or channel utilization.

In an embodiment, a wireless device is configured to obtain additional information for a wireless environment if the wireless environment information is insufficient. Criteria for determining if wireless environment information is insufficient include, but are not limited to, whether information about a particular radio frequency (RF) channel is insufficient, whether information about a particular RF neighborhood is insufficient, whether at least a portion of the wireless environment information is outdated, and/or whether the wireless environment information is originating from an insufficient number of sources.

In one or more embodiments, a wireless device is configured to obtain additional wireless environment information for a wireless environment based on the type of additional wireless environment information that is needed. Operations for obtaining wireless environment information is referred to herein as scanning. Scanning configurations include, but are not limited to, the time period or duration of a scan, a specific start/stop time for scanning, the RF channel (including but not limited to start/stop frequency, channel width, and primary channel) on which scanning takes place, configuration of the radio during scan (including but not limited to number of Rx chains (such as, RF analog and digital circuitry) to use for scanning, if spectrum sensing or Fast Fourier Transform (FFT) is enabled during the scan, and the types of information to collect during the scan) and/or the frequency with which scanning takes place.

In one or more embodiments, a set of one or more wireless devices are selected to obtain additional wireless environment information for a wireless environment based on the attributes of the set of wireless devices and/or other wireless devices in the wireless environment.

In one or more embodiments, one or more parameters of one or more wireless devices in a wireless environment are configured based at least on the additional wireless network information obtained for the wireless environment. A wireless device being configured may or may not be the same as a wireless device that obtained the additional wireless network information. A wireless device being configured may be, for example, an access point or a client device.

B. ARCHITECHTURAL OVERVIEW

FIG. 1 illustrates an example of a system in accordance with one or more embodiments. As illustrated in FIG. 1, system 100 includes a wireless environment management engine 102, a data repository 104, and one or more wireless devices 122. In one or more embodiments, System 100 may include more or less components, than the components illustrated in FIG. 1. The components illustrated in FIG. 1 may be local to or remote from each other. The components illustrated in FIG. 1 may be implemented in software and/or hardware and may be distributed over one or more applications and/or machines. In an embodiment, components within system 100 (for example, wireless environment management engine 102 and data repository 104) are implemented on a same device. Operations described with respect to one component may instead be performed by another component.

In one or more embodiments, wireless devices 122 includes digital devices including functionality to transmit and/or receive information from each other without being connected by an electrical conductor. Wireless devices 122 may communicate using wireless communication components such as an IEEE 802.11 wireless interface. The term "digital device" generally refers to any hardware device that includes a processor. A digital device may refer to a physical controller device or a hardware device executing a virtual controller.

In an embodiment, information is transmitted and/or received by a wireless device 122 using wireless signals within a particular range of frequencies, which is referred to herein as a channel. In an example, a wireless device 122 includes functionality to operate in multiple channels or bands. In an example, a wireless device 122 is configured to operate in at most one of a plurality of channels at any given time. For example, the IEEE 802.11 2.4 GHz band is divided into fourteen (14) channels.

Examples of wireless devices include a computer, a tablet, a laptop, a desktop, a netbook, a server, a web server, authentication server, an authentication-authorization-accounting (AAA) server, a Domain Name System (DNS) server, a Dynamic Host Configuration Protocol (DHCP) server, an Internet Protocol (IP) server, a Virtual Private Network (VPN) server, a network policy server, a mainframe, a television, a content receiver, a set-top box, a video gaming console, a printer, a mobile handset, a smartphone, a personal digital assistant "PDA", a wireless receiver and/or transmitter, a base station, a communication management device, a router, a switch, a controller, an access point, and/or a client device.

In an embodiment, wireless devices 122 includes one or more access points. An access point is a wireless device that is configured to provide a network service. In an example, an access point provides a Wireless Local Area Network (WLAN) using wireless signals based on IEEE 802.11 standards.

In an example, an access point is configured to operate on a particular channel, referred to herein as a current operating channel or a home operating channel. Other wireless devices operating in the current operating channel may connect to the access point to connect to a network service.

In an example, an access point is configured to scan a wireless environment using one or more channels. An access point may be configured to perform scanning in a current operating channel and/or switch to another channel for performing a scanning operation. During scanning of a particular channel, an access point is not able to receive wireless signals in other channels. An access point operating in a first channel needs to go off-channel in order to perform a scan of a second channel. An access point may be configured to perform periodic scanning and to cycle through multiple channels during one scanning operation. Alternatively, the access point may be configured to perform randomized scanning, or trigger scanning based on a certain activity (such as high/low load, interference, or client activity).

In an embodiment, wireless devices 122 includes one or more client devices. A client device is a wireless device that is configured to receive a network service. A client devices may be configured to receive voice data streams, video data streams, or any other type of data.

In an embodiment, wireless devices 122 includes a scanning wireless device. As referred to herein, a scanning wireless device is a wireless device that is selected to obtain additional information related to a wireless environment if wireless environment information is insufficient. An example set of operations for selecting the wireless device, to obtain additional wireless environment information, is described below with reference Operation 206 in FIG. 2.

Wireless devices 122 are associated with one or more RF neighborhoods 124-126. In an embodiment, a RF neighborhood refers to a statically or dynamically defined geographical space. In one example, a RF neighborhood refers to a floor of a building, a wing of a building, a conference room within the building, a lobby, and a section in an outdoor stadium. In an embodiment, a RF neighborhood refers to a geographical space that is within a RF communication range from a particular device. In an embodiment, a physical environment may be partitioned into multiple RF neighborhoods that are each isolated from other RF neighborhoods. A RF neighborhood is isolated if it is not reachable by at least one wireless device in another RF neighborhood. In another embodiment, a physical environment may be partitioned into multiple RF neighborhoods that overlap with each other. One wireless device may be associated with one or more RF neighborhoods.

In an embodiment, a RF neighborhood refers to (a) a geographical space that is within a RF communication range from at least one of a set of devices or (b) a set of devices. The set of devices, as referred to in this paragraph, may include devices that are within:
   (a) a RF communications range from a particular device,
   (b) a RF communications range from devices within x hops from a particular device,
   (c) a RF communications range of all other devices within the same set of devices, or
   (d) a RF communications range of at least one device within the set of devices.

A first device is within a wireless communication range (referred to herein as "reachable") of a second device when a wireless signal transmitted by the second device at a certain transmit power is received by the first device at or above a threshold signal strength value. The transmit power and threshold signal strength value may be configured statically or dynamically for any system.

A number of hops, as referenced above, corresponds to a number of intermediary devices necessary for wireless communication between two devices. In an example, if a first device is within a wireless communication range of a second device, zero intermediary devices are needed. If a first device and second device are not within a wireless communication range of each other, but are both within a wireless communication range of a third device, then the first device and second device are reachable via one intermediary device. A RF neighborhood may be defined as devices directly reachable from a particular device or reachable via n intermediary devices.

In one or more embodiments, data repository 104 is any type of storage unit and/or device (e.g., a file system, database, collection of tables, or any other storage mechanism) for storing data. Further, the data repository 104 may include multiple different storage units and/or devices. The multiple different storage units and/or devices may or may not be of the same type or located at the same physical site. Further, data repository 104 may be or may execute on the same computing system as wireless environment management engine 102 or any of wireless devices 122. Alternatively or additionally, data repository 104 may be on a separate computing system than wireless environment management engine 102. Data repository 104 may be connected to wireless environment management engine 102 and/or wireless devices 122 via a direct connection or via a network. Wireless environment information 112, sufficiency criteria 114, device attributes 116, scanning configurations 118, and device configurations 120 may be implemented across any of the devices within System 100, however, are illustrated within data repository 104 for purposes of clarity/explanation.

In one or more embodiments, wireless environment information 112 includes characteristics pertaining to a wireless environment. Wireless environment information 112 may be specific to one or more wireless devices 122, or one or more RF neighborhoods 124. Wireless environment information 112 may be determined with respect to one or more overlapping or non-overlapping channels. Wireless environment information is determined as a function of received wireless signals.

In an example, wireless environment information 112 includes a noise floor. A noise floor is a measure of the background noise generated from noise sources in the wireless environment and/or RF neighborhood. The noise sources may include external noise sources, noise from components internal to the measuring device or thermal noise. The presence of noise degrades the quality of the signal(s) being monitored. A signal that is received at a signal strength that is close to or below the noise floor may be corrupted or not detectable by the receiver, thereby requiring re-transmission.

In an example, wireless environment information 112 includes channel utilization (including Wi-Fi channel utilization and/or non-Wi-Fi Channel utilization from interfering sources). Channel utilization is a measurement of the amount of time that Wi-Fi traffic and/or non-Wi-Fi traffic (such as, interference) are present in a channel. A high channel utilization may cause co-channel interference or other poor network performance.

In an example, wireless environment information 112 includes the number of wireless devices 122 (including access points and/or client devices) in the wireless environment and/or RF neighborhood, the locations of wireless devices 122, and/or the density of wireless devices 122. In an example, wireless environment information 112 includes device density. A geographical area with a very low density of access points may lead to poor network performance due to lack network coverage. A geographical area with a very high density of wireless devices 122 operating on a same channel may result in congestion and/or interference.

In an example, wireless environment information 112 includes identification of unused channels in the wireless environment and/or RF neighborhood. Channels with overlapping frequency space may cause adjacent cell interference, which leads to decreased throughput, increased latency, and poor network performance.

In other examples, wireless environment information 112 includes load balance (comparison of loads of different wireless devices), network intrusion (attempt to access a network by a third-party intruding device), detection of other interferences, detection of specific wireless signals (such as, beacons of access points), identification of client devices associated with access points, identification of channels used by client devices, identification of access points in a RF neighborhood, and/or peak usage time and least usage time of a wireless device.

In an embodiment, wireless environment information 112 includes information derived from detected data that is received at one or more wireless devices 122 as well as information derived from estimated data, as if received at one or more wireless devices 122. Estimated data, as if received at a first wireless device, may be determined based on detected data received at a second wireless device. Some examples of estimating data are described in U.S. patent application Ser. No. 14/788,310, filed Jun. 30, 2015, titled "Estimating Signal Strength at a Target Wireless Device," and U.S. patent application Ser. No. 14/788,397, filed Jun. 30, 2015, titled "Estimating Channel Utilization for a Target Wireless Device," all of which are incorporated by reference.

In one or more embodiments, sufficiency criteria 114 corresponds to criteria for determining whether wireless environment information 112 is sufficient for performing one or more operations (e.g., configuring device parameters). In one example, sufficiency criteria 114 defines a minimum number of devices used for determining the wireless environment information 112. If the wireless environment information 112 is determined based on data (e.g., wireless signals) gathered by a small number of devices, the wireless environment information 112 may be inaccurate due to variations and/or errors. Accordingly, sufficiency criteria 114 may recite a minimum number of devices that together can collect data for determining the wireless environment information 112.

In an embodiment, sufficiency criteria 114 defines a maximum period of time since the wireless environment information 112 was collected. If a period of time since wireless environment information 112 was collected exceeds the maximum period of time, the wireless environment information 112 is determined to be (a) unusable or (b) of a low quality. Sufficiency criteria 114 may be defined per channel. The wireless environment information 112 collected for a specific channel is compared to the sufficiency criteria 114 for that channel to determine if the wireless environment information 112 is sufficient.

In an example, sufficiency criteria 114 requires current wireless environment information 112 on each channel in the wireless environment for every RF neighborhood. Specifically, sufficiency criteria 114 requires that the last received information, on each channel, is within a current time window, which may be defined by minutes, hours, days, weeks, or another time period. A duration of a current time window may be different for different types of information. A longer current time window may be set for relatively static information, whereas a shorter current time window may be set for frequently changing information. For example, since the location of access points is relatively static, a current time window for information identifying which access points are located in a particular RF neighborhood may be longer, such as, one day. As another example, since channel utilization changes quickly, a current time window for channel utilization may be shorter, such as thirty minutes.

In another example, sufficiency criteria 114 requires current wireless environment information 112 on each RF neighborhood 124. Specifically, sufficiency criteria 114 is defined with respect to data collected by one or more wireless devices 122 in the RF neighborhood 124. The sufficiency criteria 114 requires that noise floor information needs to be obtained, within the last thirty minutes, from at least two wireless devices in RF neighborhood 124. RF neighborhood 124 includes a first wireless device, a second wireless device, and a third wireless. Thus, even if there is no noise floor information collected by the first wireless device within the last thirty minutes, as long as there is noise floor information collected by the second wireless device and by the third wireless device within the last thirty minutes, the sufficiency criteria 114 is met.

In another example, sufficiency criteria 114 requires that wireless environment information 112 include a threshold ratio of detected data to estimated data, and/or include estimated data that is above a threshold confidence level. The confidence level of estimated data is based on factors such as the number of sources providing detected data on which the estimation is based, the margin of error within which the detected data matches historic patterns of data, and/or the standard deviation (or other measurement of change over time) of the detected data. For example, a sufficiency criteria 114 requires that a noise floor is either detected or estimated for all access points within a RF neighborhood 124 within the last thirty minutes, and that the estimated data be determined with a confidence level above 80%.

In one or more embodiments, device attributes 116 include one or more attributes or characteristics of wireless devices 122. Device attributes 116 include, but are not limited to, loads of wireless devices 122, whether wireless devices 122 are serving any active calls, current operating channels of wireless devices 122, the RF neighborhoods associated with each wireless device 122, and/or historical success of each wireless device 122 in obtaining data for a RF neighborhood 124. A scanning wireless device may be selected, from wireless devices 122, based on device attributes 116.

In one or more embodiments, scanning configurations 118 include one or more settings or parameters associated with operations for obtaining wireless environment information 112. Scanning configurations 118 may be set based on the type of wireless environment information 112 to be obtained. Scanning configurations 118 include, but are not limited to, the time period or duration of a scan, the RF channel on which scanning takes place, and/or the frequency with which scanning takes place. For example, if information related to a beacon of a wireless device is insufficient, then the scanning duration is configured to be at least the time interval between beacon transmissions, in order to capture at least one beacon. As another example, if information related to a particular RF channel is insufficient, then the wireless device is configured to scan this particular RF channel.

In one or more embodiments, device configurations 120 include one or more settings or parameters of one or more wireless devices 122. Device configurations 120 are set based on wireless environment information 112, which may be based on detected data or estimated data. In an example, device configurations 120 of a particular wireless device 122 are set based on detected data received at other wireless devices 122. Device configurations 120 include, but are not limited to, selecting (or not selecting) an operating channel, selecting a transmit cell size and/or receive cell size, making a load balancing decision, and/or determining whether to associate a client device with a particular access point. For example, if additional wireless network information obtained by a scanning wireless device indicates that a noise floor on a particular channel is low, then another wireless device, in the same RF neighborhood 124 as the scanning wireless device, may be configured to operate in the particular channel.

In one or more embodiments, wireless environment management engine 102 includes one or more digital devices configured to perform operations described herein for cooperative scanning of wireless devices. In an example, wireless environment management engine 102 is the same as or implemented on a same device as one or more of wireless devices 122. In another example, wireless environment management engine 102 is implemented on a separate device from wireless devices 122, such as at a controller and/or a server located in a cloud computing environment. Examples of operations performed by the wireless environment management engine 102 are described below with reference to FIG. 2.

C. CONFIGURE A WIRELESS DEVICE TO OBTAIN ADDITIONAL WIRELESS NETWORK INFORMATION FOR A WIRELESS ENVIRONMENT

Figure 2:
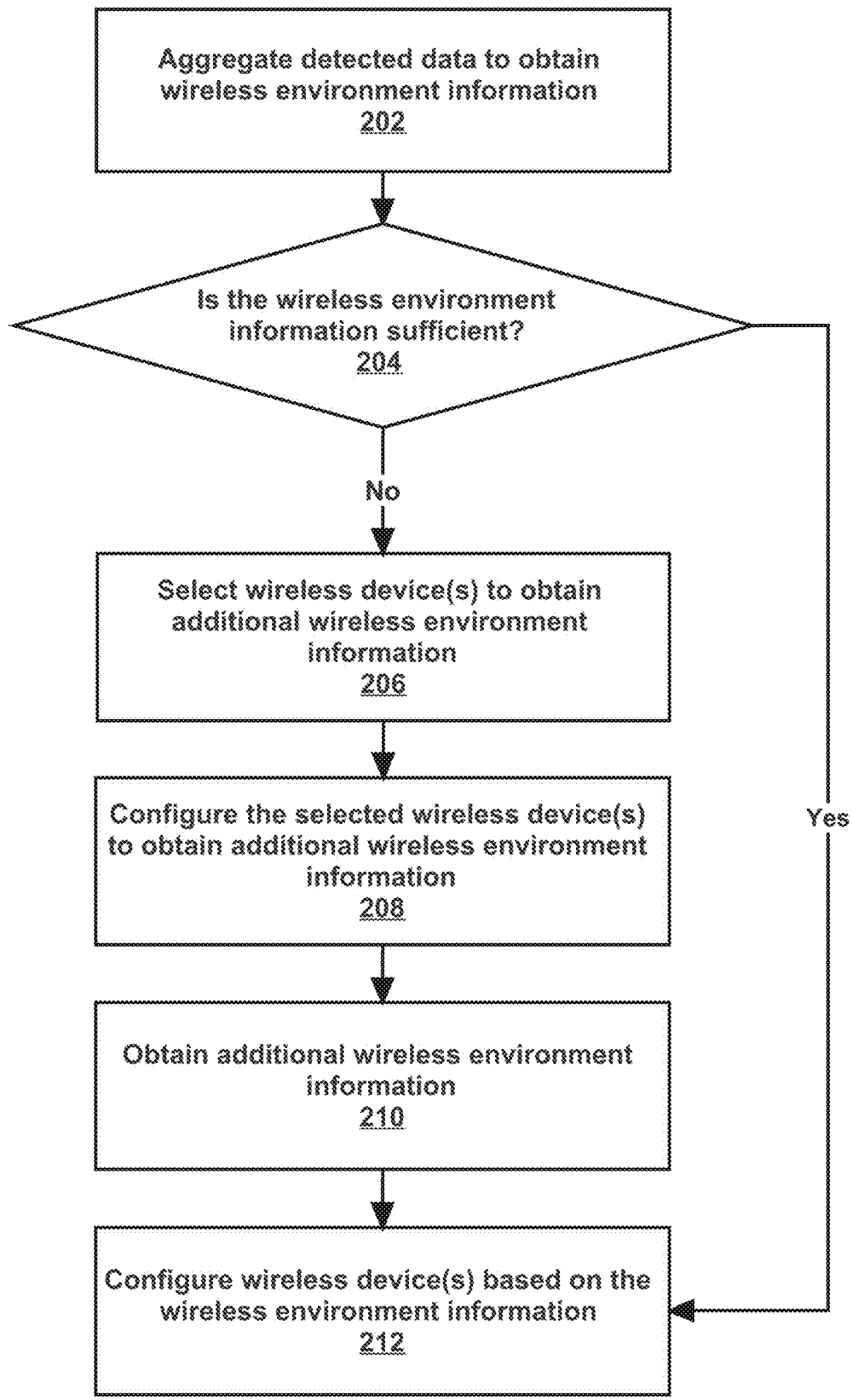
FIG. 2 shows an example set of operations for cooperative scanning in accordance with one or more embodiments.

FIG. 2 illustrates an example set of operations for configuring a wireless device to obtain information for a wireless environment in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

Initially, data corresponding to a set of wireless signals detected by one or more wireless devices is aggregated to obtain wireless environment information (Operation 202). Wireless environment information is determined, for example, as a function of received wireless signals received by the one or more wireless devices. The wireless environment information may be a function of (a) signal strength associated with received wireless signals, (b) a source of wireless signals, (c) a type of wireless signals (e.g., Wi-Fi or non-Wi-Fi), or (d) a channel on which the wireless signals are received.

In an embodiment, wireless signals are received by a subset of wireless devices of a plurality of wireless devices in the wireless environment. The wireless signals may be received across by the wireless devices across all RF channels or a subset of RF channels. The wireless signals may be received by a device(s) cycling through multiple channels in order to obtain information about the multiple channels.

In an embodiment, the wireless devices detect one or more properties of the wireless signals, such as source, frequency, amplitude, signal strength, and/or phase. In an example, the data detected by a particular wireless device is processed to obtain wireless environment information pertaining to the particular wireless device. For example, a measurement of a noise signal, which is created from ambient noise sources in the wireless environment, is detected by a wireless device. This measurement is processed to obtain a noise floor for this wireless device. In another example, a measurement of a noise signal is detected by a first wireless device and a second wireless device, respectively. The measurements are aggregated to find that a higher noise floor exists at the first wireless device. The higher noise floor at the first wireless device implicates that a noise source is located closer to the first wireless device. As another example, a measurement of a noise signal is detected by a first set of wireless devices in a first RF neighborhood and a second set of wireless devices in a second RF neighborhood, respectively. The measurements of the first set of wireless devices are averaged to obtain an average noise floor for the first RF neighborhood. The measurements of the second set of wireless devices are averaged to obtain an average noise floor for the second RF neighborhood. A RF neighborhood with a lower average noise floor is identified. As another example, a measurement of the amount of time that wireless traffic is present in a particular channel is detected by wireless devices in a wireless environment over one day. Information on channel utilization of each wireless device over time is obtained. Thus, particular time periods and locations associated with high channel utilization are identified. As another example, client devices detected by access points in a RF neighborhood are aggregated to determine client devices located in the RF neighborhood.

As another example, a distance between a first wireless device and a second wireless device is obtained. A wireless signal is transmitted at a particular transmit power from a first device and received at a particular signal strength at a second wireless device. A RF distance, or a path loss, between the first wireless device and the second wireless device is determined based on the difference in the particular transmit power and the particular signal strength. A physical distance between the first wireless device and the second wireless device is calculated by applying the RF distance to a path loss model, such as a log-distance path loss model and/or Friis transmission equation.

In an example, the wireless devices detect data corresponding to wireless signals independently of each other. For example, each wireless device is set on an independent scanning schedule with independent scanning configurations. A first wireless device performs scanning every hour, during which each channel is scanned for 100 ms. A second wireless device performs scanning every 30 minutes, during which each channel is scanned for 50 ms. If the scanning schedule of one wireless device is interrupted, the interruption is not communicated to other wireless devices.

In another example, the wireless devices detect data corresponding to wireless signals in a coordinated plan. Scanning configurations may be coordinated at the time of deployment or may be dynamically updated. For example, a first wireless device and a second wireless device alternatively perform scanning of a RF neighborhood. As another example, a first wireless device and a second wireless device in a RF neighborhood do not perform scanning on any overlapping channels. As another example, when a high channel utilization is detected at a RF neighborhood, the time interval between scannings performed by a wireless device in the RF neighborhood is decreased.

In an embodiment, an inquiry is made as to whether the wireless environment information is sufficient (Operation 204). Determining whether the wireless environment information is sufficient involves comparing the wireless environment information to sufficiency criteria.

In an example, a sufficiency criterion requires that wireless environment information is based on wireless signals detected within a current time window (e.g., last two minutes). The timestamp of the last received wireless environment information is compared to a current time window. If the last received information is within the current time window, then the sufficiency criteria is met. If the last received information is outside of the particular time window, then the sufficiency criteria not met. As another example, a sufficiency criterion requires that wireless environment information pertaining to the particular wireless device in a particular channel be current. Then, the timestamp of the last received wireless environment information for the particular channel is compared to a current time window. Different time windows may be used for different types of wireless environment information and/or different channels.

In an example, wireless environment information pertaining to a RF neighborhood and/or a wireless environment is compared to a sufficiency criterion. For example, a sufficiency criterion requires that wireless environment information of a RF neighborhood be obtained from at least a particular fraction (e.g., 50%) of the wireless devices in the RF neighborhood. If the wireless environment information corresponds to data collected by less than 50% of the wireless devices in the RF neighborhood, the wireless environment information does not meet the sufficiency criteria. If the wireless environment information corresponds to data collected at least by 50% of the wireless devices in the RF neighborhood, then the wireless environment information meets the sufficiency criteria. As another example, a sufficiency criterion requires that a set of wireless environment information obtained from a first wireless device be within a margin of error of a set of wireless environment information obtained from a second wireless device. If sets of the wireless environment information do not fall within the margin of error, the sets of wireless environment information do not meet the sufficiency criteria. If sets of wireless environment information fall within the margin of error, then the sets of wireless environment information meet the sufficiency criteria.

In an embodiment, if the wireless environment information is insufficient, then one or more wireless devices are selected to obtain additional information for the wireless environment (Operation 206).

In an embodiment, a candidate set of scanning wireless devices are selected from a plurality of wireless devices in the wireless environment based on RF neighborhoods. In an example, there is insufficient wireless environment information pertaining to a particular RF neighborhood. One or more wireless devices associated with the particular RF neighborhood are selected as a candidate set. In another example, a candidate set of scanning wireless devices includes all access points in a wireless environment.

In an embodiment, one or more scanning wireless devices are selected from a candidate set of scanning wireless devices based on device attributes of the candidate set of wireless devices. A wireless device that has device attributes that are well suited, or best suited, for obtaining additional wireless environment information is selected. A wireless device that has device attributes that are not suited for obtaining additional wireless environment information is not selected.

In an example, device attributes are compared to selection criteria to determine a suitability of selecting a wireless device as a scanning wireless device. As an example, a selection criterion requires that a scanning wireless device is not serving any active connections. As another example, a selection criterion requires that a scanning wireless device is not serving active connections that are latency sensitive and/or error sensitive.

In another example, device attributes of a first wireless device are compared to device attributes of a second wireless device to determine a suitability of selecting the first wireless device versus the second wireless device. For example, a wireless device with a lighter load or a lower channel utilization is selected. As another example, a first wireless device is associated with a first RF neighborhood and a second RF neighborhood, both of which have insufficient wireless environment information. The first wireless device is selected over a second wireless device that is only associated with the first RF neighborhood.

In another example, device attributes are compared to the wireless environment information to determine a suitability of selecting a wireless device as a scanning wireless device. Based on the additional wireless environment information that is needed for the wireless environment, a scanning wireless device is selected. For example, a wireless device that is operating on a particular channel, on which wireless environment information is insufficient, is selected to obtain additional wireless environment information on the particular channel. As another example, a wireless device that has a history of successfully obtaining the additional wireless environment information that is needed is selected as a scanning wireless device.

In an example, the number of scanning wireless devices selected is a function of the additional wireless environment information to be obtained. In an example, detected data from a lower number of scanning wireless devices are required if information about the wireless environment has already been previously gathered. Information previously gathered include identification of which wireless devices are stationary, relationships between wireless devices, and other historic information. In an example, information about a wireless signal sent from a stationary transmitting device, as opposed to information about a wireless signal sent from a mobile transmitting device, may be obtained from data detected by a lower number of wireless devices.

In an example, a lowest number of wireless devices are selected as scanning wireless devices. In an example, information about a first wireless device is insufficient (e.g., information about a RF neighborhood associated with the first wireless device). Historic data gathered by a system defines a relationship between a first wireless device and a second wireless device, and this relationship may be used to estimate information about the first wireless device based on data detected by the second wireless device. Thus, a single wireless device, the second wireless device, is selected to obtain additional wireless environment information about the first wireless device. In another example, information about a first wireless device is insufficient. A second wireless device and a third wireless device detect data to obtain additional wireless environment information about the first wireless device. However, the additional wireless environment information obtained from data detected by the second wireless device significantly differs from the additional wireless environment information obtained from data detected by the third wireless device. A fourth wireless device is selected to obtain additional wireless environment information about the first wireless device. Thus, three wireless devices are a lowest number of wireless devices necessary to obtain additional wireless environment information about the first wireless device.

In an embodiment, the one or more wireless devices that have been selected are configured to obtain additional information for the wireless environment (Operation 208). In an example, scanning configurations are determined based on the additional wireless environment information to be obtained. For example, if the additional wireless environment information to be obtained is based on a beacon transmitted by an access point at an interval of 100 ms, then a duration of a scan needs to be at least that interval (100 ms or more) in order to guarantee that the scan captures at least one beacon. As another example, if the additional wireless environment information to be obtained is a noise floor, then a scan of a short duration is sufficient. As another example, if additional wireless environment information on a particular channel is to be obtained, then a scanning wireless device is configured to scan that particular channel. As another example, additional wireless environment information to be obtained is required to be current. The last received information needs to be within a current time window (for example, within the last thirty minutes). Then a scanning interval is set to be at most the duration of the current time window.

In an embodiment, additional wireless environment information is obtained by the selected wireless devices (Operation 210). The additional information may pertain to any wireless device, a RF neighborhood, and/or a wireless environment. In an example, additional information is obtained directly from data detected at a scanning wireless device, such as, a noise floor at the scanning wireless device.

In another example, additional wireless environment information is obtained through estimations based on data detected at a scanning wireless device. For example, a noise floor at a particular wireless device is estimated based on a noise floor at the scanning wireless device. In another example, additional wireless environment information is obtained through other processing of data detected at a scanning wireless device. For example, an average noise floor of a RF neighborhood is calculated by averaging various noise floors detected at scanning wireless devices within the RF neighborhood. As another example, a physical distance between a first wireless device and a second wireless device is estimated by applying a path loss, detected at a first wireless device and/or a second wireless device, to a path loss model.

In an embodiment, one or more wireless devices are configured based at least on the obtained additional wireless network information (Operation 212). In addition, one or more wireless devices may be configured based on the initially obtained wireless network information as referenced in Operation 202. A wireless device being configured may or may not be the same as a scanning wireless device, which obtained the additional wireless network information. In an example, a wireless device being configured is in the same RF neighborhood as the scanning wireless device. In another embodiment, device configurations of a wireless device may be determined to remain unchanged based on the additional wireless network information.

In an example, a wireless device is configured to operate in a particular channel based on the additional wireless environment information. For example, a scanning wireless device detects a strong signal strength of wireless signals in a particular channel. An estimated signal strength, as if received at another wireless device, which is operating on a different channel, is determined to be also strong. Thus, this wireless device is configured to switch to the particular channel. As another example, a scanning wireless device detects a high channel utilization in a particular channel. An estimated channel utilization at another wireless device is determined to be high. This wireless device is configured to switch to the particular channel in order to serve the high traffic in the particular channel.

In an example, a wireless device is configured to select a transmit cell size and/or receive cell size based on the additional wireless environment information. For example, a wireless device selects a transmit power and/or a receive sensitivity based on a noise floor estimated for the wireless device. As another example, a wireless device selects a Modulation and Coding Scheme (MCS) and/or data rate based on a channel utilization estimated for the wireless device. As another example, a wireless device selects a noise floor setting, a probe response threshold, and/or a client de-authentication threshold, based on a noise floor estimated for the wireless device.

In an example, a wireless device performs load balancing based on the additional wireless environment information. For example, a signal strength of a wireless signal, received at a scanning wireless device operating in a first channel, is determined, and a signal strength of the wireless signal, as if received at a second wireless device operating in a second channel, is estimated. The estimated signal strength is sufficiently strong for communication of data. Then, the second wireless device may be configured to switch to the first channel and make an association with the transmitting device of the wireless signal, and the scanning wireless device may be configured to reject an association with the transmitting device.

In an example, a new wireless device may be configured to be added to the wireless environment based on the additional wireless environment information. For example, the additional wireless environment information indicates that the physical distance between the two closest wireless devices is relatively far. A new wireless device is added to reduce the physical distance between the two closest wireless devices.

D. EXAMPLE EMBODIMENT

A detailed example is described below for purposes of clarity. Components and/or operations described below should be understood as one specific example which may not be applicable to certain embodiments. Accordingly, components and/or operations described below should not be construed as limiting the scope of any of the claims. Features, components, and/or operations described with regard to this example embodiment are not necessarily applicable to other embodiments.

Figure 3:
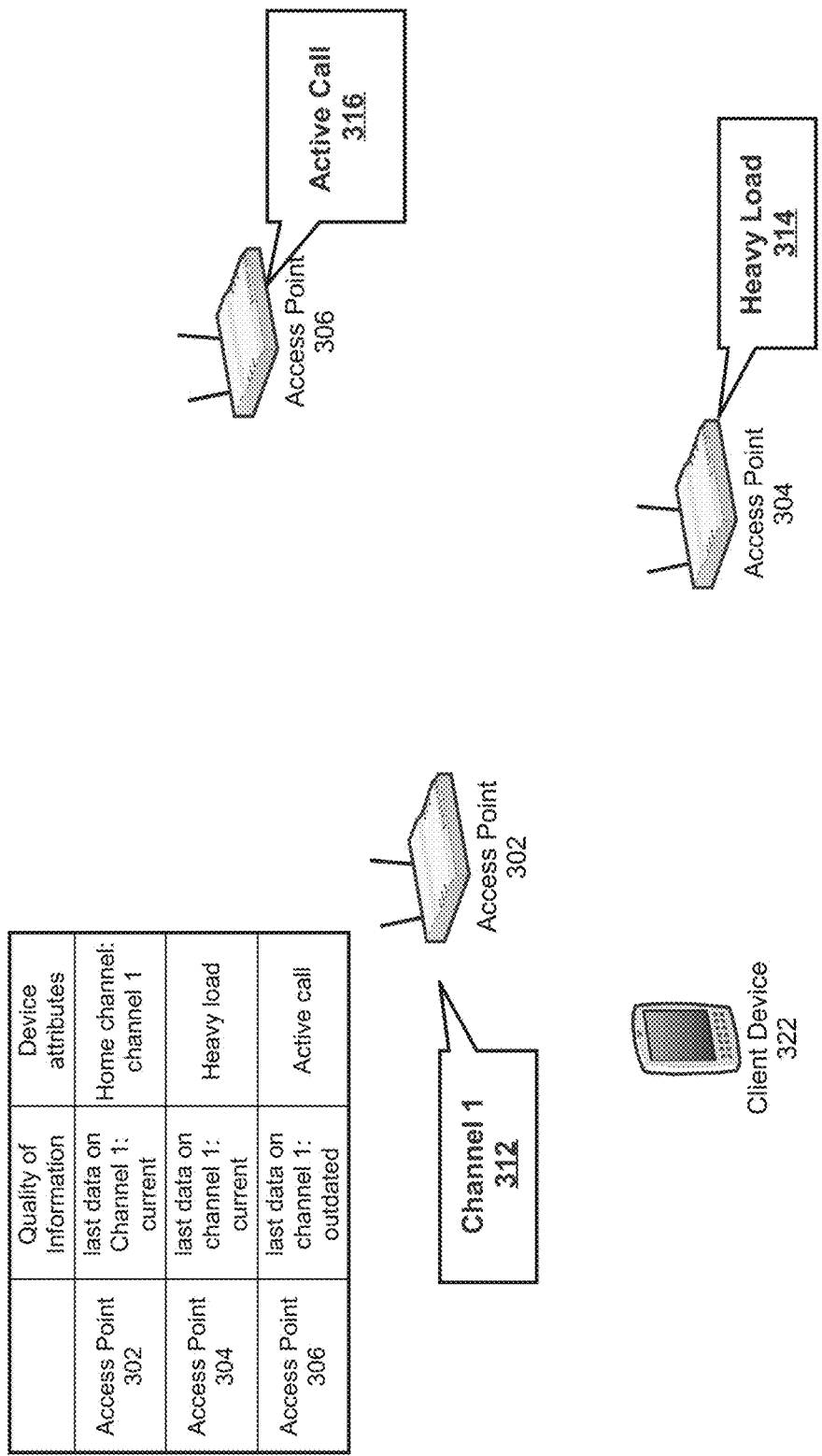
FIG. 3 illustrates one example of cooperative scanning of access points in accordance with one or more embodiments.

FIG. 3 illustrates one example of cooperative scanning of access points in accordance with one or more embodiments. Access points 302, 304, and 306, and client device 322 are in a RF neighborhood of a wireless environment. Access point 302 operates in channel 1, access point 304 operates in channel 6, and access point 306 operates in channel 11. Access points 302, 304, and 306 perform scanning of each channel in the wireless environment at periodic intervals. Access point 306 serves an active client in channel 11 for forty (40) seconds. While serving the active client in channel 11, access point 306 does not perform scanning of other channels at periodic intervals.

Data corresponding to wireless signals, in each channel, detected by access points 302, 304, and 306, are aggregated to obtain wireless environment information. Once piece of wireless environment information is a noise floor. One criterion for determining whether additional information is needed is that the last received wireless environment information on each channel is received within a current time window of thirty (30) seconds. Quality of information 332 may be stored in a table. The information on channel 1 obtained by access point 302 is current. The information on channel 1 obtained by access point 304 is current. However, the information on channel 1, including the noise floor on channel 1, obtained by access point 306 is outdated, because access point 306 has not performed scanning on channel 1 while on the active call.

Since access points 302, 304, and 306 are in the same RF neighborhood, access points 302, 304, and 306 are a candidate set of scanning wireless devices, which can be configured to obtain additional information for the wireless environment. Device attributes 334 of access points 302, 304, and 306 are inquired to select a well-suited access point to perform scanning of channel 1. Access point 306 is serving an active client that has a high latency sensitivity on channel 11. Taking access point 306 off from channel 11 would interrupt the active client connection. Therefore, access point 306 is not selected.

Access point 304 is serving a heavy load on channel 6. Even though the traffic on access point 304 may not be sensitive to delays or errors, if access point 304 is taken off channel 6, the large amount of data communication accessing access point 304 would be disrupted. Therefore, access point 304 is not selected.

Access point 302 is operating in channel 1. Therefore, access point 302 is able to scan channel 1 on its home operating channel. Access point 302 is selected to obtain additional wireless network information on channel 1.

Access point 302 is configured to obtain additional wireless environment information. A scanning configuration is to remain on channel 1. Another scanning configuration is a duration of the scanning that is sufficient to obtain the additional wireless environment information needed. The duration is set to 15 ms to obtain information on the noise floor.

Data on wireless signals in channel 1 is detected by access point 302. A noise floor of −70 dB is found at access point 302. An estimation of the data on the wireless signals, as if received by access point 306, is estimated, based on the data detected by access point 302 as well as other historic information. For example, it is known that a noise floor at access point 302 and a noise floor at access point 306 is typically 10 dB apart. This difference is applied to the detected noise floor of −70 dB. Thus, a noise floor of −80 is estimated at access point 306. Hence, additional wireless environment information has been obtained Client device 322 is operating on channel 1 and initially associated with access point 302. However, the additional wireless environment information indicates that the noise floor in channel 1 at access point 306 is lower. After the active connection on access point 306 is completed, access point 306 may be configured to operate in channel 1 and associate with client device 322. Meanwhile, access point 302 is configured to reject an association with client device 322.

E. MISCELLANEOUS; EXTENSIONS

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

F. HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
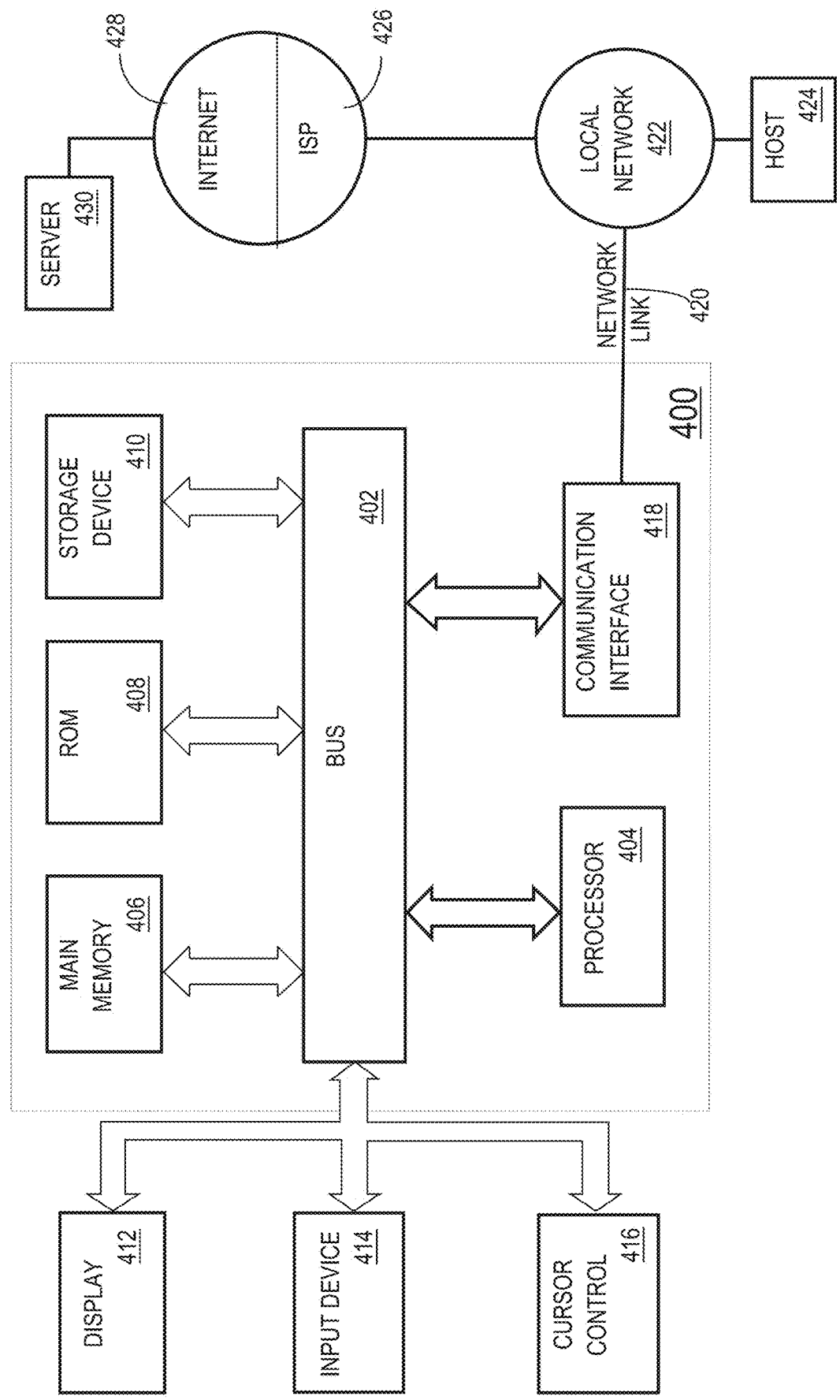
FIG. 4 shows a block diagram that illustrates a computer system in accordance with one or more embodiments.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
    aggregating data corresponding to a set of wireless signals detected by one or more wireless devices, of a plurality of wireless devices in a wireless environment, to obtain a set of wireless environment information;
    determining that a timestamp associated with last-received wireless information in the set of wireless information is outside a current time window;
    wherein the last-received wireless information is associated with a particular channel; the current time window is a first channel-specific current time window associated with the particular channel;
    a second channel-specific current time window, different from the first channel-specific current time window, is associated with at least one other channel; and
    responsive to the determining operation, configuring at least a first wireless device, of the plurality of wireless devices, to obtain additional information for the wireless environment.

2. The medium of claim 1, wherein the determining operation is performed for a particular radio frequency neighborhood, and wherein the first wireless device is selected from the particular radio frequency neighborhood.

3. The medium of claim 1, wherein the determining operation is performed for a particular radio frequency channel, and wherein the first wireless device is configured to obtain the additional information for the particular radio frequency channel.

4. The medium of claim 1, the operations further comprising:
    determining that a subset, of the set of wireless environment information, that corresponds to a particular radio frequency neighborhood is originating from an insufficient number of wireless devices from the plurality of wireless devices.

5. The medium of claim 1, the operations further comprising:
    determining that data detected by a second wireless device, of the plurality of wireless devices, is outdated, and the second wireless device is different from the first wireless device.

6. The medium of claim 5, wherein the second wireless device and the first wireless device are in a same radio frequency neighborhood.

7. The medium of claim 1, wherein the operations further comprise:
    prior to configuring the first wireless device to obtain the additional information:
    identifying at least two wireless devices, of the plurality of wireless devices, corresponding to a particular radio frequency neighborhood;
    determining a load at each wireless device of the at least two wireless devices;
    selecting the first wireless device from the at least two wireless devices based on the load at the first wireless device.

8. The medium of claim 7, wherein selecting the first wireless device from the at least two wireless devices is based on determining that the load at the first wireless device is less than the load of another of the at least two wireless devices.

9. The medium of claim 1, wherein the operations further comprise:
    prior to configuring the first wireless device to obtain the additional information:
    identifying at least two, of the plurality of wireless devices, corresponding to a particular radio frequency neighborhood;
    identifying characteristics of any active connections at each wireless device of the at least two wireless devices;
    selecting the first wireless device from the at least two wireless devices based on (a) the characteristics of any active connections at the first wireless device or (b) determining that there are no active connections at the first wireless device.

10. The medium of claim 9, wherein the characteristics of any active connections at each wireless device comprise latency sensitivity or error sensitivity of the data being transmitted or received by each wireless device.

11. The medium of claim 1, wherein the operations further comprise:
    prior to configuring the first wireless device to obtain the additional information:
    identifying at least two, of the plurality of wireless devices, corresponding to a particular radio frequency neighborhood;
    identifying a current operating channel for each wireless device of the at least two wireless devices;
    selecting the first wireless device from the at least two wireless devices based on the current operating channel of the first wireless device.

12. The medium of claim 1, wherein the operations further comprise:
    selecting the first wireless device for obtaining the additional information based on a current operating channel of the first wireless device matching a particular channel for which the additional information is needed.

13. The medium of claim 1, wherein the operations further comprise:
selecting the first wireless device for obtaining the additional information based on a set of radio frequency neighborhoods to which the first wireless device belongs.

14. The medium of claim 1, wherein the operations further comprise:
selecting a subset of devices from the plurality of wireless devices to obtain the additional information, wherein the selecting operation is based on selecting the subset with a lowest number of devices that can obtain the additional information.

15. The medium of claim 1, wherein the operations further comprise:
selecting a time period for the first wireless device to obtain the additional information based on the set of wireless information.

16. The medium of claim 1, wherein the operations further comprise:
selecting a frequency with which the first wireless device is to obtain the additional information based on the set of wireless information.

17. The medium of claim 1, wherein the operations are performed by a controller.

18. The medium of claim 1, wherein the operations further comprise:
selecting the first wireless device to obtain the additional information based on historical information related to a subset of the plurality of wireless devices successfully obtaining information for a particular radio frequency neighborhood.

19. The medium of claim 1, wherein the operations further comprise:
configuring one or more parameters of a second wireless device based on the additional information obtained by the first wireless device.

* * * * *